United States Patent
Falchero et al.

(10) Patent No.: US 10,076,977 B2
(45) Date of Patent: Sep. 18, 2018

(54) REAR BACKREST LEVER WITH REMOTE CONTROL

(71) Applicant: LEAR CORPORATION, Southfield, MI (US)

(72) Inventors: Angelo Falchero, Turin (IT); Giovanni De Nichilo, Grugliasco (IT)

(73) Assignee: LEAR CORPORATION, Southfield, MI (US)

( * ) Notice: Subject to any disclaimer, the term of this patent is extended or adjusted under 35 U.S.C. 154(b) by 212 days.

(21) Appl. No.: 15/056,031

(22) Filed: Feb. 29, 2016

(65) Prior Publication Data
US 2017/0246969 A1    Aug. 31, 2017

(51) Int. Cl.
*B60N 2/22* (2006.01)
*B60N 2/20* (2006.01)

(52) U.S. Cl.
CPC .......... *B60N 2/22* (2013.01); *B60N 2/20* (2013.01); *B60N 2/2227* (2013.01)

(58) Field of Classification Search
CPC .......... B60N 2/2245; B60N 2/20; B60N 2/22; B60N 2/2227
USPC ....................................... 297/378.1
See application file for complete search history.

(56) References Cited

U.S. PATENT DOCUMENTS

| | | | |
|---|---|---|---|
| 4,887,864 A | 12/1989 | Ashton | |
| 6,644,730 B2* | 11/2003 | Sugiura | B60N 2/01583 296/65.09 |
| 7,137,667 B2* | 11/2006 | Habedank | B60N 2/206 297/344.1 |
| 7,862,121 B2* | 1/2011 | Ishijima | B60N 2/0296 297/367 R |
| 8,465,096 B2* | 6/2013 | Sayama | B60N 2/2356 296/65.05 |
| 8,678,501 B2 | 3/2014 | Jockel | |
| 9,539,919 B2* | 1/2017 | Pleskot | B60N 2/2356 |
| 2010/0320824 A1* | 12/2010 | Aoki | B60N 2/01583 297/378.1 |
| 2013/0193731 A1* | 8/2013 | Morimoto | B60N 2/682 297/342 |

FOREIGN PATENT DOCUMENTS

| | | |
|---|---|---|
| EP | 0029997 A1 | 6/1981 |
| EP | 0 594 527 A1 | 10/1993 |

* cited by examiner

*Primary Examiner* — David R Dunn
*Assistant Examiner* — Tania Abraham
(74) *Attorney, Agent, or Firm* — Brooks Kushman P.C.

(57) ABSTRACT

A modular backrest control includes a mounting bracket, a pivot bracket attached to the mounting bracket, a pivot rod rotatably mounted on the pivot bracket, a lever arm mounted on the pivot rod, and a user actuated lever handle rigidly mounted on the pivot rod. The lever arm is rotatable from a first position to a second position. The lever arm has a connector for attachment to a backrest actuation cable. The user actuated lever handle is rotatable between a lock position and a release position such that rotation of the lever handle from the lock position to the release position causes rotation of the lever arm from a first position to a second position. Characteristically, rotation from the first position to the second position actuates the backrest actuation cable.

14 Claims, 9 Drawing Sheets

US 10,076,977 B2

REAR BACKREST LEVER WITH REMOTE CONTROL

TECHNICAL FIELD

In at least one aspect, the present invention related to actuation systems for vehicle seats, and in particular, backrest control modules.

BACKGROUND

Successful automotive vehicle design requires consideration of numerous diverse design objectives. Components comprising the automobile must often meet criteria ranging from strength and durability to style and comfort. Moreover, increased functionality combined with ease of installation are also important vehicle design characteristics.

The prior art teaches an automotive seat that includes a seat cushion, and a backrest pivotally mounted to the seat cushion so that the backrest may be reclined at a selected angle relative to the seat cushion for comfort. To improve seat comfort, a headrest is often defined on the upper portion of the backrest, for example, by supporting a cushion atop the backrest using a pair of posts that are slidably received in complementary guides defined in the upper portion of the backrest frame. Actuation mechanisms for the backrest and head restraint are often assembled as integral components of the vehicle seat. Given the large number of vehicle designs, this approach leads to an equally large number of actuation designs.

Accordingly, there is a need for improved seatback controls that can be installed in a variety of automobile designs.

SUMMARY

The present invention solves one or more problems of the prior art by providing in at least one embodiment, a modular backrest remote control. The modular backrest remote control includes a mounting bracket assembly, a pivot bracket attached to the mounting bracket assembly, a pivot rod rotatably mounted on the pivot bracket, a lever arm mounted on the pivot rod, and a user actuated lever handle rigidly mounted on the pivot rod. The lever arm is rotatable from a first position to a second position. The lever arm has a connector for attachment to a backrest actuation cable. The user actuated lever handle is rotatable between a lock position and a release position such that rotation of the lever handle from the lock position to the release position causes rotation of the lever arm from a first position to a second position. Characteristically, rotation from the first position to the second position actuates the backrest actuation cable. Advantageously, the modular backrest remote control is not part of a vehicle seat and is, therefore, mountable in a vehicle independently of the vehicle seat.

In another embodiment, a modular backrest remote control is provided. The modular backrest remote control includes a mounting bracket assembly, a pivot bracket attached to the mounting bracket assembly, a pivot rod rotatably mounted on the pivot bracket, a lever arm mounted on the pivot rod, a user actuated lever handle rigidly mounted on the pivot rod, and a biasing spring. The mounting bracket assembly includes a mounting bracket, a first side bracket and a second side bracket. The first side bracket and the second side bracket being attached to the mounting bracket to define a central cavity in which the pivot bracket is positioned. The lever arm is rotatable from a first position to a second position, the lever arm having a connector for attachment to a backrest actuation cable. Similarly, the user actuated lever handle is rotatable between a lock position and a release position. The biasing spring biases the user actuated lever handle to the lock position with a biasing force such that rotation of the user actuated lever handle from the lock position to the release position against the biasing force of the biasing spring causes rotation of the lever arm from a first position to a second position. Rotation from the first position to the second position actuates the backrest actuation cable. Advantageously, the modular backrest remote control is not part of a vehicle seat and is therefore, mountable in a vehicle independently of the vehicle seat.

DETAILED DESCRIPTION

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
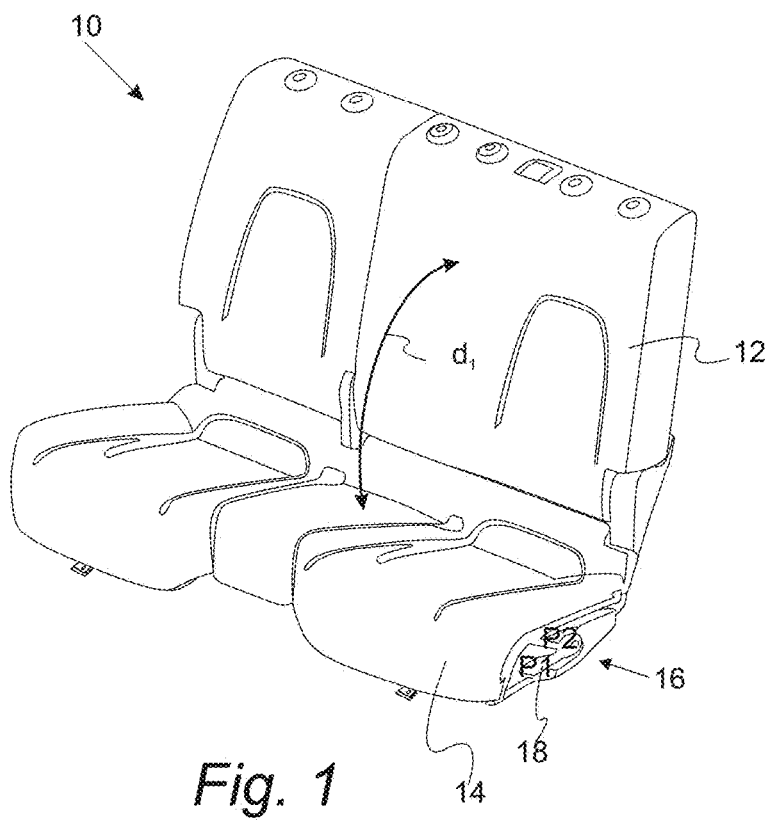
FIG. 1 is a perspective view of a vehicle seat and an associated backrest remote control.
Figure 2:
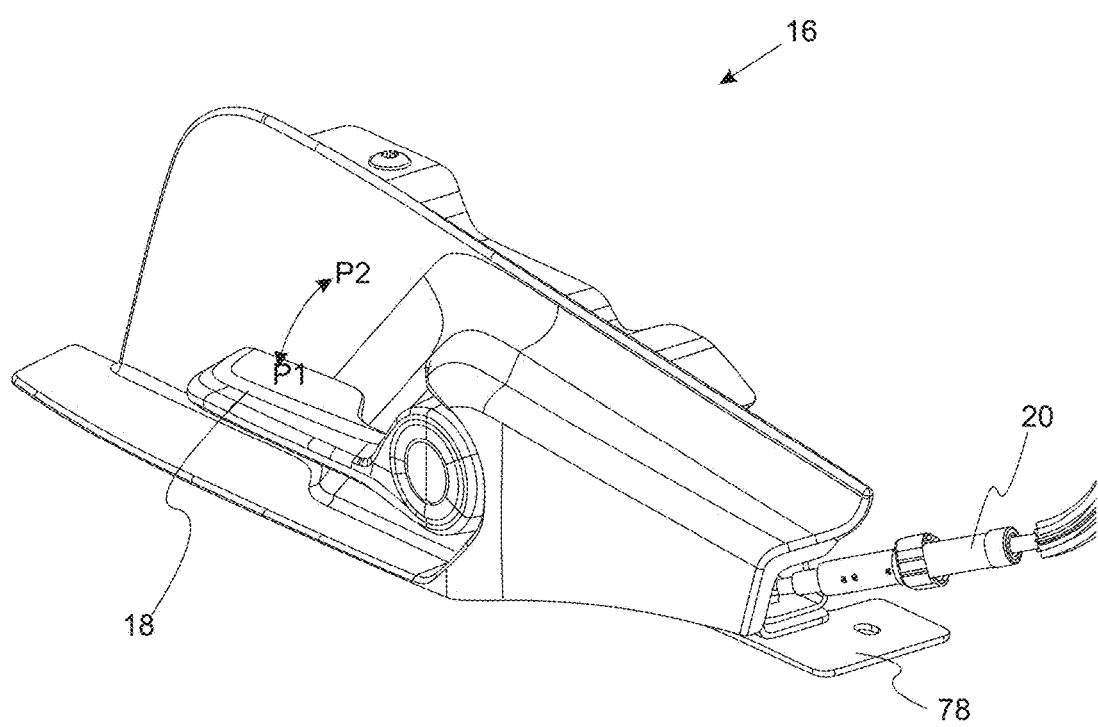
FIG. 2 is a perspective view of the assembly backrest remote control.

With reference to FIGS. 1 and 2, schematic illustrations of a vehicle seat with an associated modular remote control are provided. FIG. 1 is a perspective view of a vehicle seat with the modular remote control. FIG. 2 is a perspective view of the modular remote control. Vehicle seat 10 includes backrest 12 and seat bottom 14. In the present embodiment of the invention, seat 10 is shown as having split seatbacks in a "60%-40%" configuration. Modular remote control 16 is mounted proximate to vehicle seat 10 and, in particular, adjacent to seat bottom 14. A user operates modular remote control 16 by manually moving user actuated lever handle 18 from lock position P1 to release position P2 which initiates movement of seat backrest 12 along direction $d_1$ from the upright position depicted in FIG. 10 to a folded position. In this context, when user actuated lever handle 18 is in the lock position, backrest 12 is held in the upright position. When user actuated handle 18 is in the release position, backrest 12 is free to be moved to the folded position. Backrest actuation cable 20 connects modular remote control 16 to a backrest actuator mechanism (not shown) that initiates movement of backrest 12 between the upright and folded positions. In one variation, modular remote control 16 is mounted to a vehicle floor independently of vehicle seat bottom 14. However, typically, modular remote control 16 is mounted in a vehicle proximate to and at the side of vehicle seat bottom 14 so that it is easily actuated by a vehicle occupant.

With reference to FIGS. 2-5, schematic illustrations of modular remote control 16 are provided. Module remote control 16 includes pivot bracket 24 attached to a mounting bracket assembly as described below in more detail. A pivot rod 26 is rotatably mounted on pivot bracket 24. Pivot rod 26 includes rod ends 28 and 30. In a variation, pivot bracket 24 is a U-shaped bracket having a first side wall 32 opposing a second side wall 34. First side wall 32 and second side wall 34 are connected by third side wall 36 which is positioned onto mounting bracket 22. Pivot bracket 24 and pivot rod 26 can be made from any suitable materials such as rigid plastics, metals, or combinations thereof.

Figure 3:
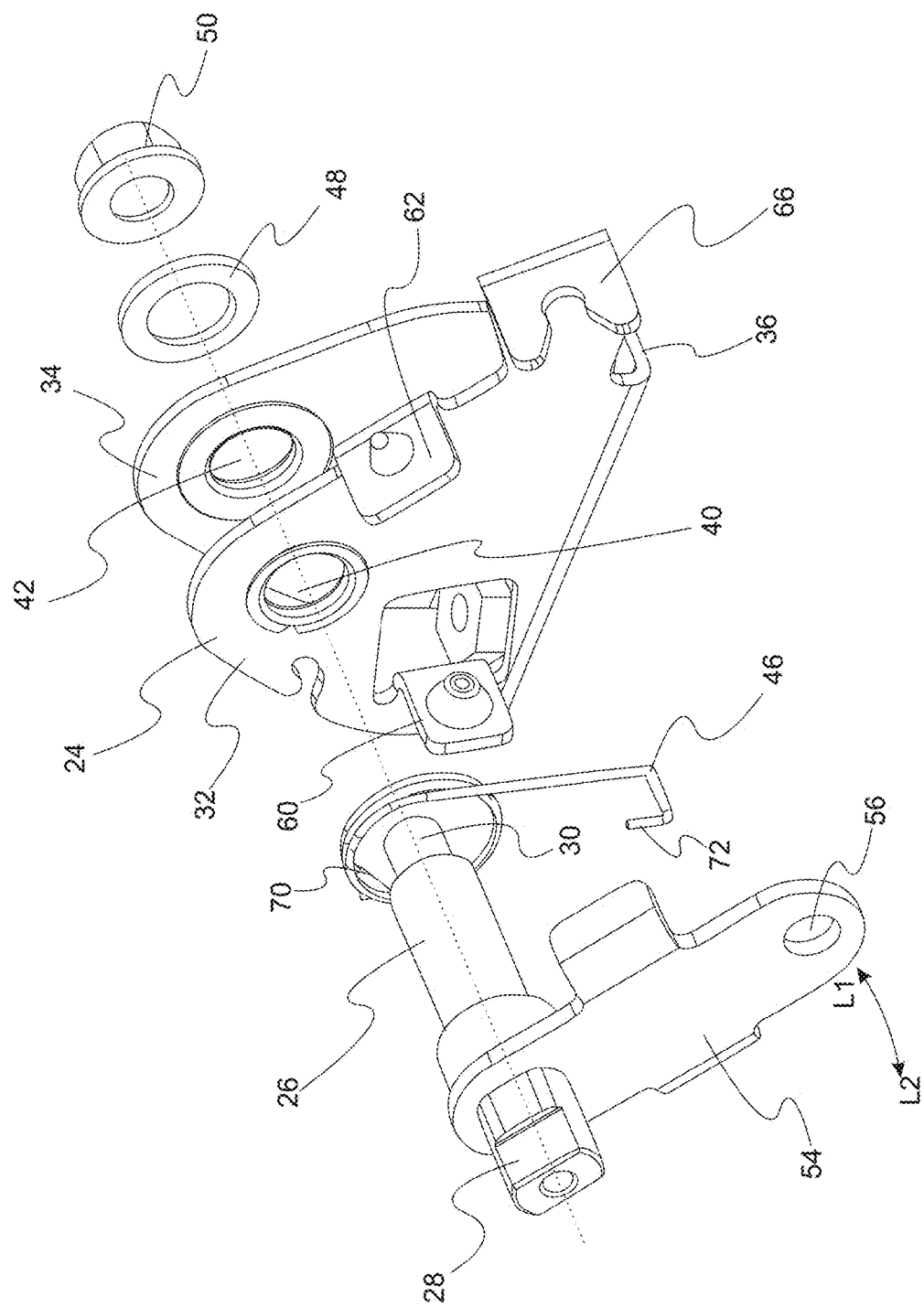
FIG. 3 is an exploded perspective view showing the assembly of a pivot rod on a pivot bracket as used in the backrest remote control of FIG. 2.

As depicted in FIG. 3, first side wall 32 and second side wall 34, respectively define openings 40 and 42. Pivot rod 26 passes through biasing spring 46, washer 48, opening 40 and opening 44. Bolt 50 is secured to end 30 of pivot rod 26 thereby holding the pivot rod in place. Washer 48 is positioned between side wall 34 and bolt 50. Lever arm 54 is mounted on rod end 28 of pivot rod 26. Characteristically, lever arm 54 is rotatable from first position P1 to second position P2. Lever arm 54 has a connector 56 for attachment to backrest actuation cable 20. User actuated lever handle 18 is rigidly mounted on pivot rod 26 such that rotation of user actuated lever handle 18 rotates pivot rod 26 and lever arm 54. In particular, rotation of user actuated lever handle 18 from lock position P1 to release position P2 causes rotation of the lever arm from a first position L1 to a second position L2 thereby actuating backrest actuation cable 20. Pivot bracket 22 also includes lever stops 60 and 62 which limit the range of motion of lever arm 54. This limitation normally corresponds to slightly greater than the range of motion between L1 and L2. Pivot bracket 22 also includes cable holding portion 66 that holds backrest actuation cable 20 in place. Biasing spring 46 biases lever arm 54 to lever lock position L1 with a biasing force which concurrently biases lever handle 18 to the locked position P1 since lever arm 54 and lever handle 18 are rigidly secured to pivot rod 26. This biasing is accomplished since spring portion 70 is rigidly held to pivot rod 26 while spring portion 72 is rigidly held to lever arm 54. Therefore, lever handle 18 is actuated against the biasing force. In a refinement, biasing spring 46 is a coiled spring and disposed around pivot rod 26. The spring coils are positioned in a manner such that the spring force act so bias lever arm 54 to lever lock position L1.

Figure 4:
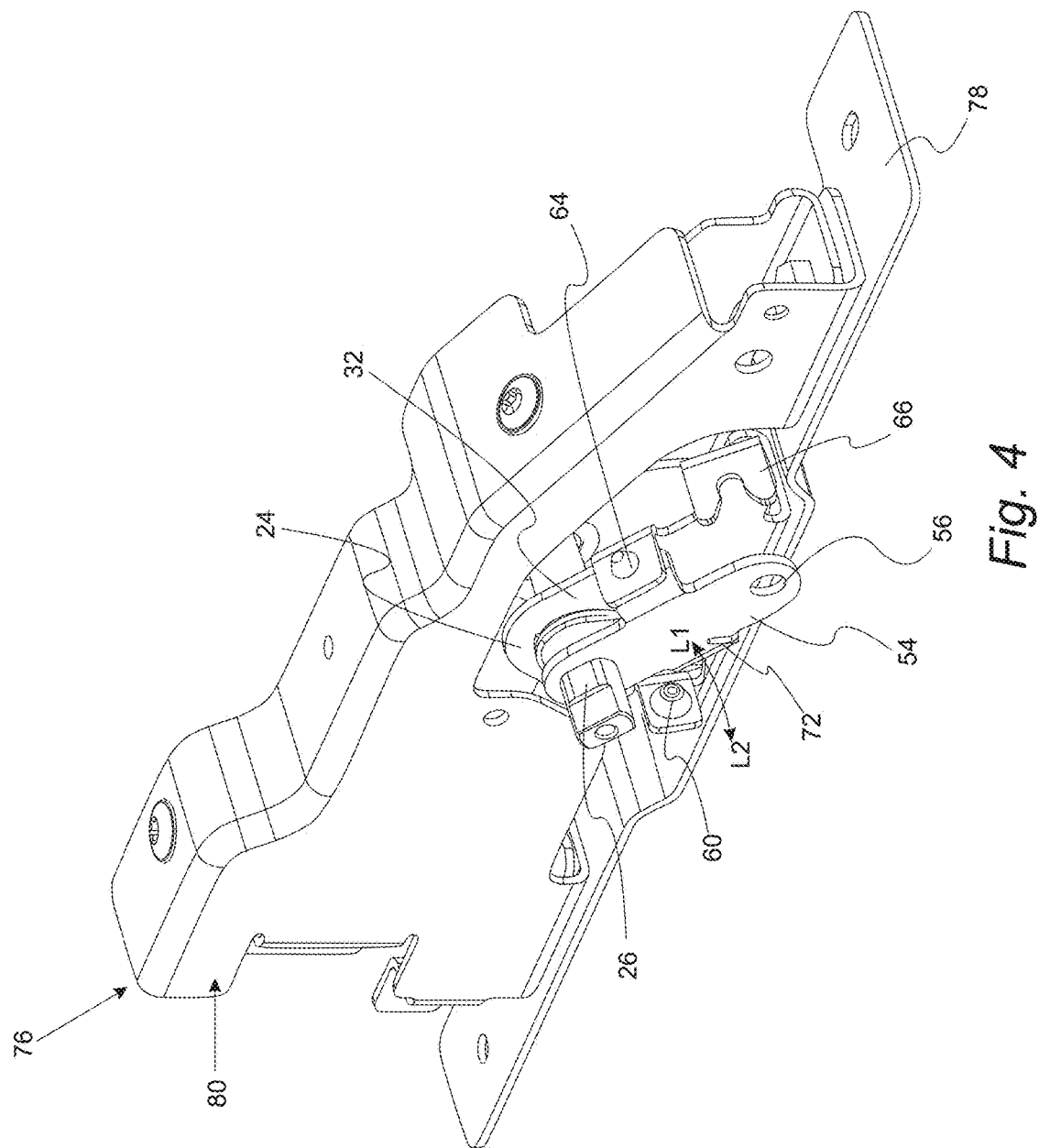
FIG. 4 is a perspective view showing the pivot bracket mounted in the mounting bracket assembly as used in the backrest remote control of FIG. 2.
Figure 5:
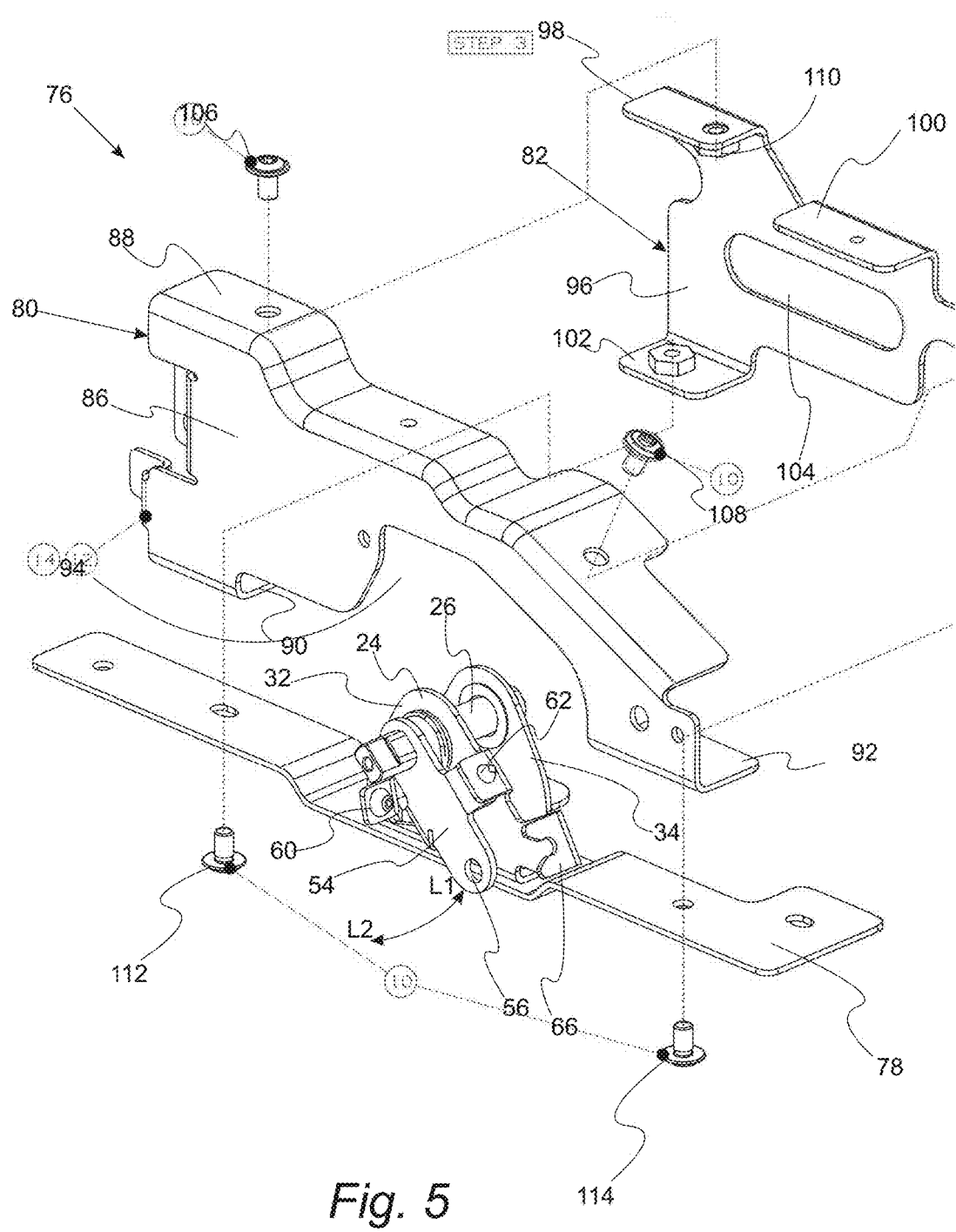
FIG. 5 is an exploded perspective view showing the pivot bracket mounted in the mounting bracket assembly as used in the backrest remote control of FIG. 2.

With reference to FIGS. 4 and 5, pivot bracket 24 is mounted to a mounting bracket assembly 76. Mounting bracket assembly 76 includes mounting bracket 78. Pivot bracket 24 is positioned on and mounted to mounting bracket 78. Mounting bracket assembly 76 also includes first side bracket 80 and a second side bracket 82. First side bracket 80 includes side wall 86 and flange region 88 which extends from the top edge of side wall 86. Flaps 90, 92 extend from the bottom edge of side wall 86. In this context, the top edge is the edge furthest on average from the vehicle floor when the remote control 16 is positioned in a vehicle. Side wall 86 defines cut away region 94 through which pivot rod 26 and lever arm 54 extend. Cut away region 94 allows movement of the lever arm during operation of remote control 16. Similarly, the bottom edge is the edge that is closest on average to the vehicle floor when the remote control 16 is positioned in a vehicle. Second side bracket 82 includes side wall 96. Flaps 98, 100 extend from the top edge of side wall 96 while flaps 102 extend from the bottom edge of side wall 96. During assembly, first side bracket 80 is mounted to second side bracket 82 with flaps 98, 100 positioned under flange region 88. Flange region 88 is then bolted to flaps 98, 100 with bolts 106, 108 and nuts 110. Similarly, flap(s) 102 are positioned over flap 90 and then bolted together with bolt 112, 114 and a set of nuts (not shown). Collectively, mounting bracket 78, first side bracket 80 and a second side bracket 82 define a cavity in which pivot bracket 24 is positioned. This cavity is formed from an offset between side wall 86 and 96 that is defined by flange region 88 and flaps 90, 92, 98-102. The components of mounting bracket assembly 76 can be made of any suitable materials such as plastics, metal, or combinations thereof.

Figure 6:
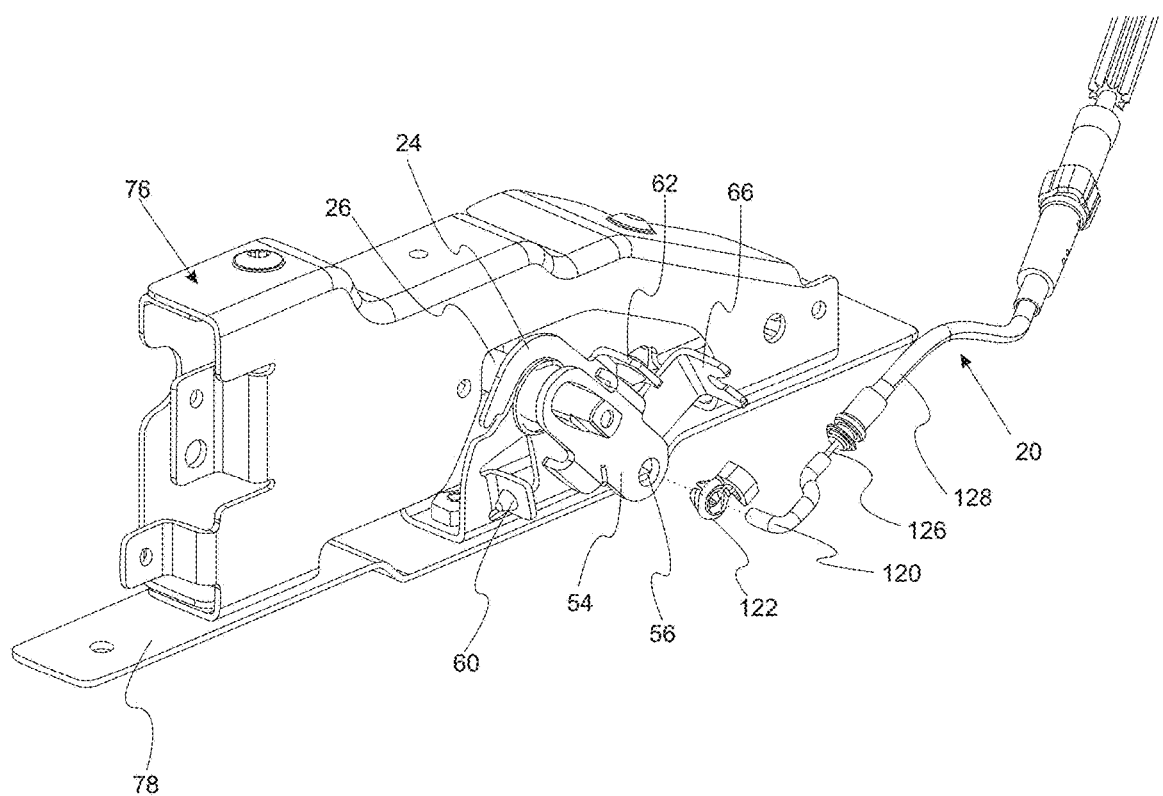
FIG. 6 is a perspective view showing the mounting of a backrest actuation cable of a pivot arm as used in the backrest remote control of FIG. 2.

With reference to FIG. 6, connection of backrest actuation cable 20 to lever arm 54 is illustrated. Cable end 120 of backrest actuation cable 20 is attached to connecter 56 which is a hole and held in place by compression nut 122. Although many different cable constructions are possible for backrest actuation cable 20, a particularly useful cable is a Bowden cable. In a Bowden cable, mechanical force is transferred by the movement of inner cable 126 relative to outer sheath 128. Inner cable 126 is connected to cable end adapter 120. In general, inner cable 126 is a steel or stainless steel. Outer sheath 128 can be formed from a helical metal cable lined with nylon and having an outer plastic covering.

Figure 7:
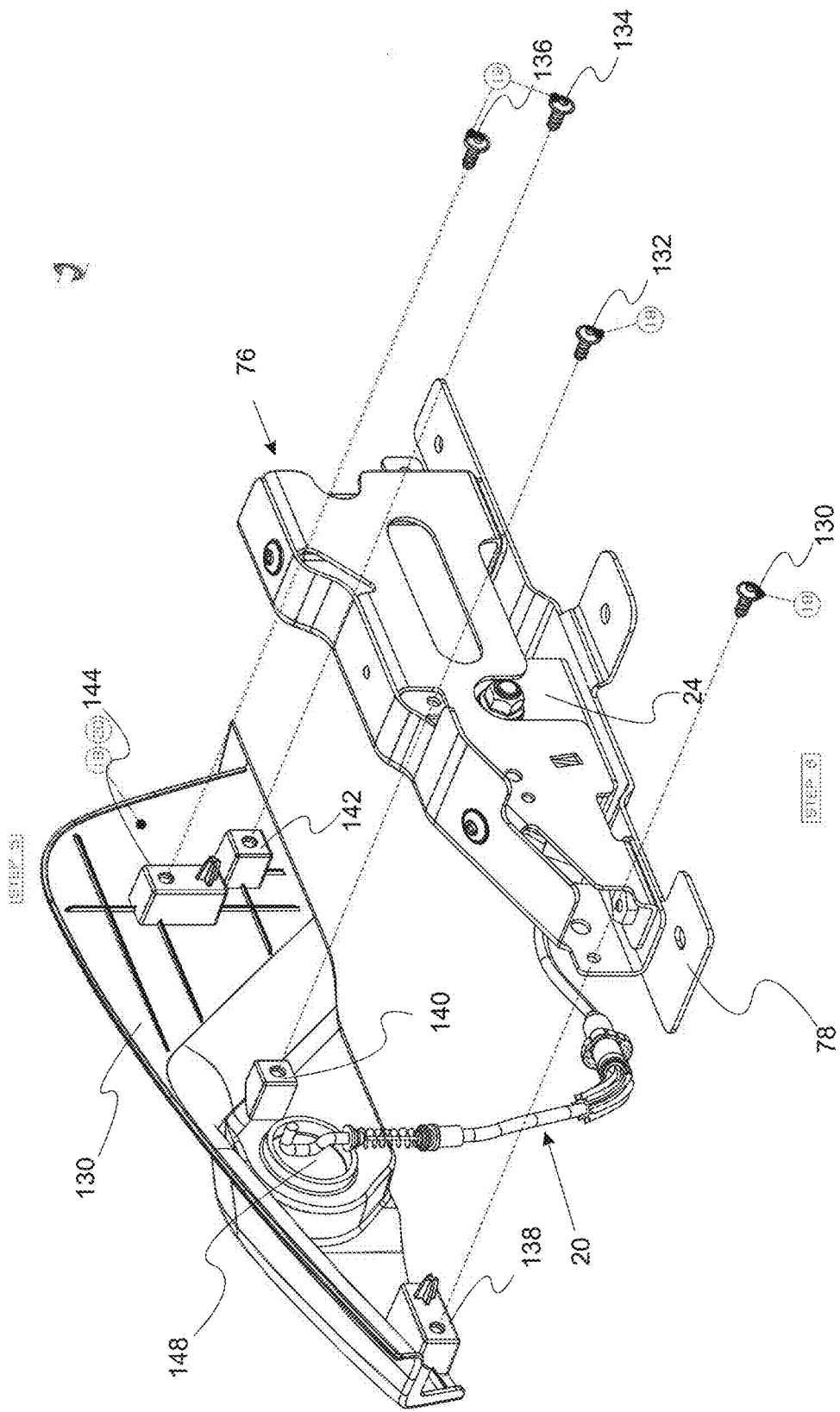
FIG. 7 is an exploded perspective view showing the mounting of a cover on the mounting bracket assembly of FIG. 4.

With reference to FIG. 7, attachment of a cover to the mounting bracket assembly is schematically depicted. Cover 130 is bolted onto mounting bracket assembly 76 by bolts 130-136 and threaded receptacle 138-142. Cover 130 can be formed from metal or plastic. Moreover, cover 130 can be contoured for aesthetics as the cover is visible after installation in a vehicle. For this reason, cover 130 is typically formed from a plastic and, in particular, a molded plastic. Receptacles 138-142 are secured to cover 130. In particular, when cover 130 is a plastic, receptacles 138-142 are molded as part of cover 130. Cover 130 defines opening 148 through which rod end 28 extends.

Figure 8:
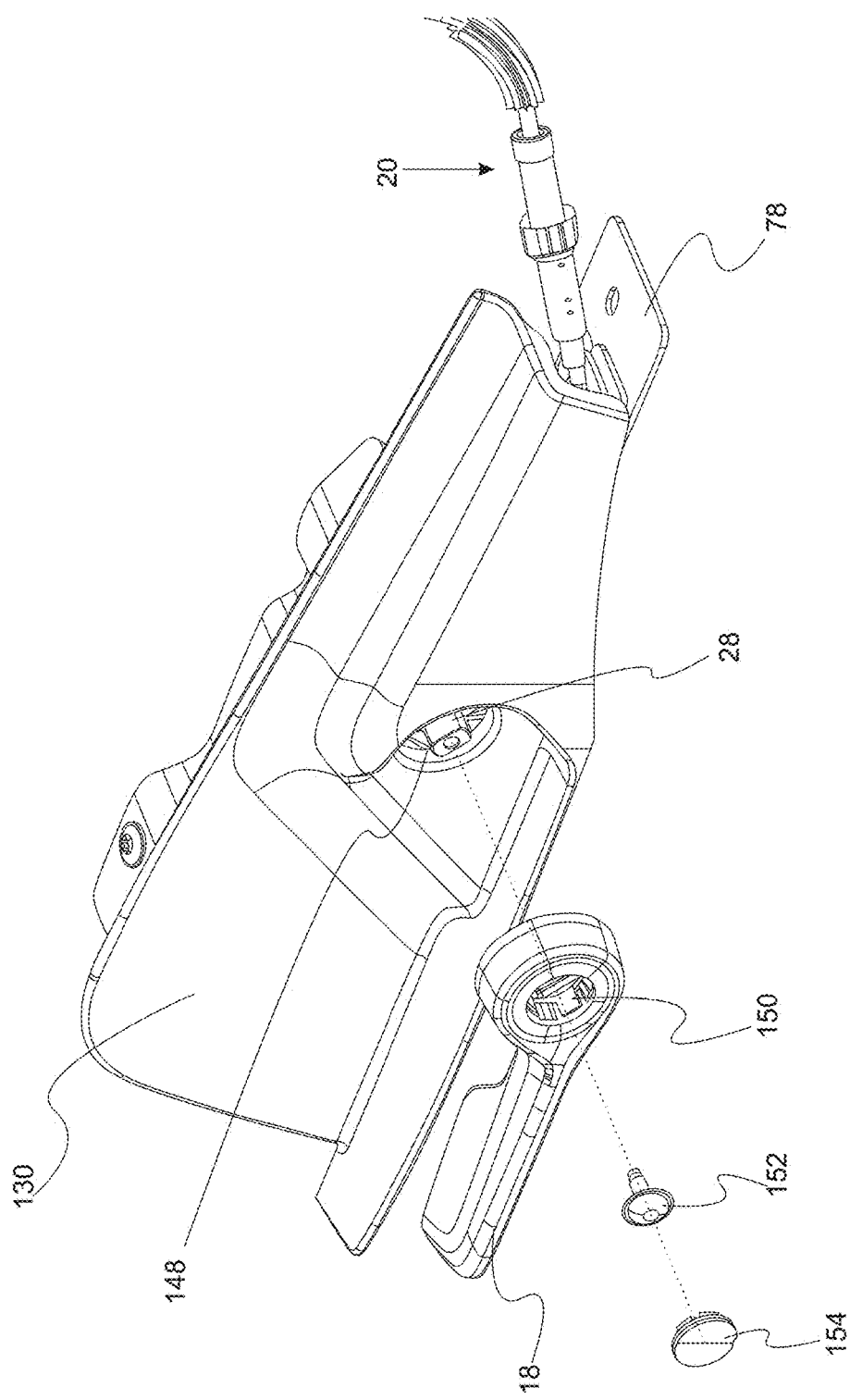
FIG. 8 is an exploded perspective view showing the mounting of a user actuated lever handle on the pivot rod of the backrest remote control of FIG. 2.

With reference to FIG. 8, the attachment of the user actuated lever handle to the pivot rod is schematically depicted. Rod end 28 extends though opening 148 of cover 130. Lever handle 18 has a receiving opening 150 that holds rod end 28. Lever handle 18 is bolted to rod end 28 by bolt 152. For aesthetics, cover 154 is positioned over bolt 152 to conceal its presence.

Figure 9A:
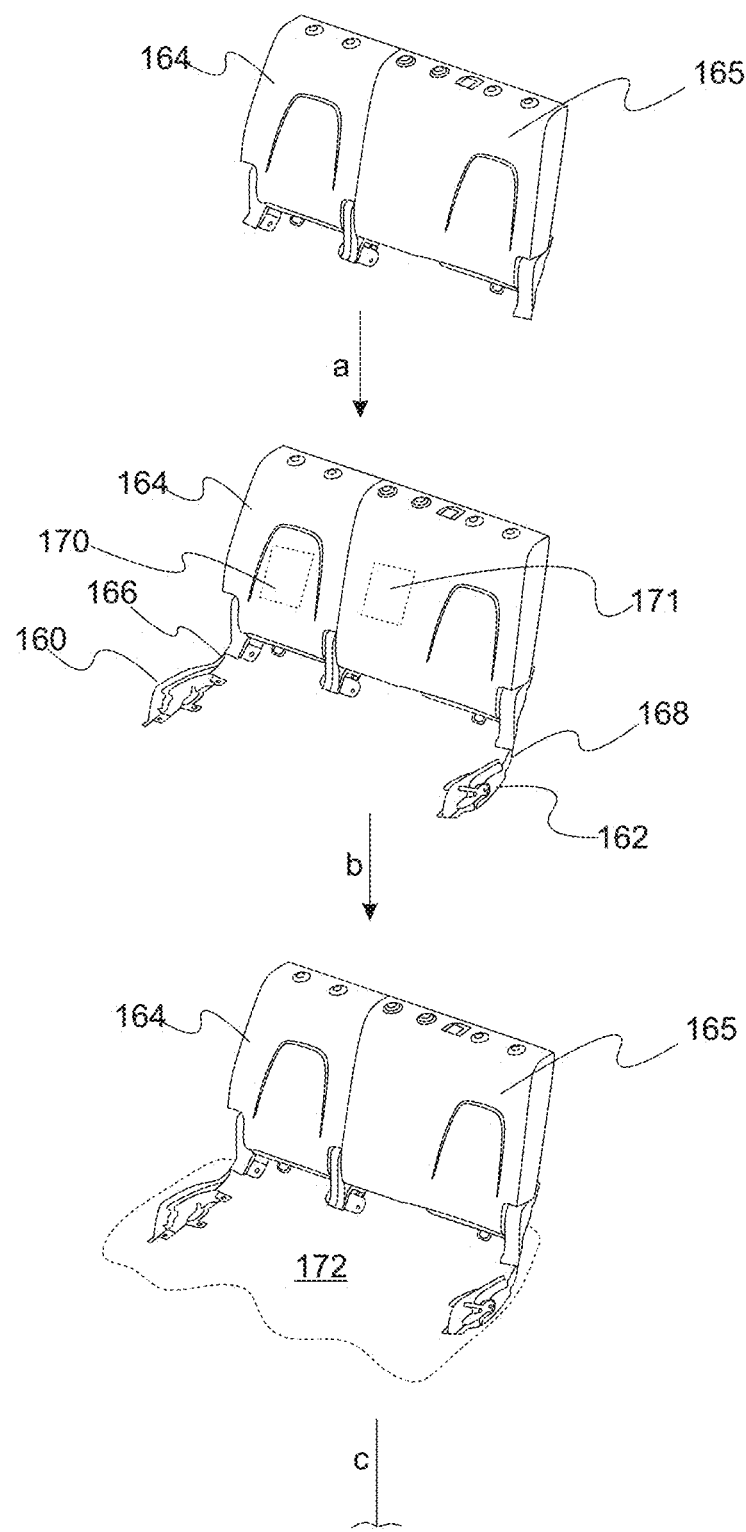
FIG. 9A is a schematic flow chart depicting a method of assembling a vehicle rear seat.
Figure 9B:
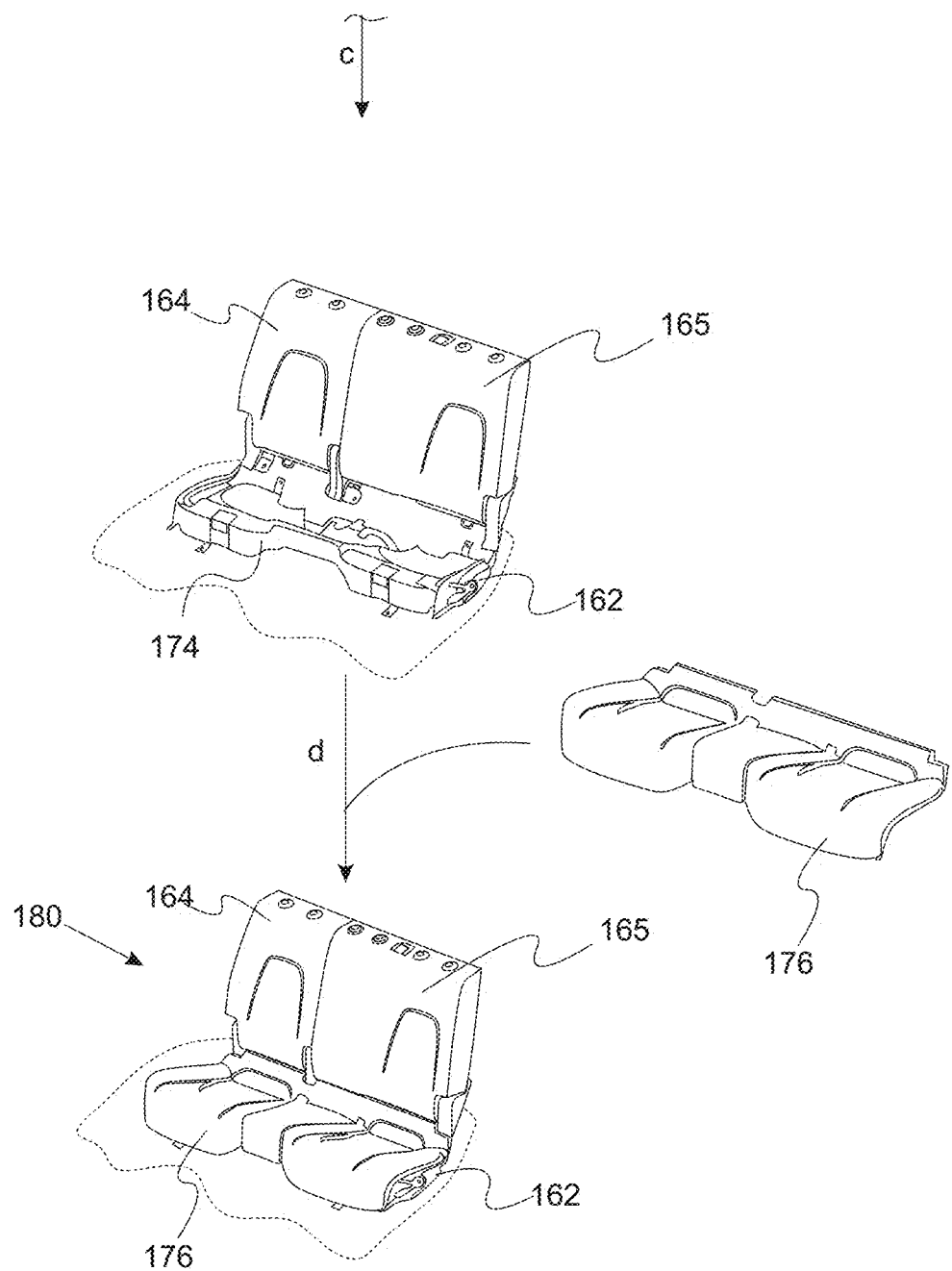
FIG. 9B is a continuation of FIG. 9A.

With reference to FIGS. 9A and 9B, a schematic flow chart depicting a method of assembling a vehicle rear seat is provided. In step a), first modular backrest remote control 160 and second modular backrest remote control 162 are attached to split seat backs 164 and 165. This attachment involves attachment of backrest actuation cables 166 and 168 to rear seat back folding mechanisms 170 and 171. In step b), seat backs 164 and 165 with first modular backrest remote control 160 and second modular backrest remote control 162 are installed in vehicle 172 at a rear seat location. In step c), seat bottom support frame 174 is attached to the vehicle 170 such that the seat bottom support frame is positioned between first modular backrest remote control 160 and second modular backrest remote control 162 and below the seat backs 164 and 165. In step d), bottom cushion 176 is positioned over the seat bottom support frame to form vehicle rear seat 180. In a refinement, one or both of first modular backrest remote control 160 and second modular backrest remote control 162 are of the design set forth above in FIGS. 1-8. As can be understood from FIGS. 9A and 9B, modular backrest remote controls 160 and 162 are preferably not fixedly attached to seat bottom support frame 174, providing flexibility in the assembly of the rear seat of the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A modular backrest remote control comprising:
   a mounting bracket assembly that includes a mounting bracket, a first side bracket attached to the mounting bracket and a second side bracket attached to the mounting bracket;
   a pivot bracket attached to the mounting bracket assembly, the pivot bracket being positioned on the mounting bracket such that the pivot bracket is positioned between the first side bracket and the second side bracket;
   a pivot rod rotatably mounted on the pivot bracket;
   a lever arm mounted on the pivot rod, the lever arm rotatable from a first position to a second position, the lever arm having a connector for attachment to a backrest actuation cable; and
   a user actuated lever handle rigidly mounted on the pivot rod, the user actuated lever handle being rotatable between a lock position and a release position such that rotation of the user actuated lever handle from the lock position to the release position causes rotation of the lever arm from a first position to a second position, wherein rotation from the first position to the second position actuates the backrest actuation cable, the modular backrest remote control being mountable in a vehicle, wherein the first side bracket and the second side bracket each independently defining a first cutout region to allow positioning of the pivot rod and wherein the pivot bracket includes a first lever stop and a second lever stop that limit a range of motion for the lever arm.

2. The modular backrest remote control of claim 1 wherein the pivot bracket is a U-shaped bracket having a first side wall opposing a second side wall, the first side wall and the second side wall connected by a third side wall.

3. The modular backrest remote control of claim 1 further comprising a cover attached to the mounting bracket assembly.

4. The modular backrest remote control of claim 1 further including a biasing spring that biases the user actuated lever handle to the lock position, the biasing spring having a first section attached to the pivot rod and a second section attached to the mounting bracket assembly.

5. The modular backrest remote control of claim 1 wherein the backrest actuation cable includes an inner cable and an outer sheath such that mechanical force is transferred by movement of the inner cable relative to the outer sheath.

6. A modular backrest remote control comprising:
   a mounting bracket assembly including a mounting bracket, a first side bracket and a second side bracket, the first side bracket and the second side bracket being attached to the mounting bracket to define a central cavity;
   a pivot bracket attached to the mounting bracket and positioned in the central cavity;
   a pivot rod rotatably mounted on the pivot bracket;
   a lever arm mounted on the pivot rod, the lever arm rotatable from a first position to a second position, the lever arm having a connector for attachment to a backrest actuation cable;
   a user actuated lever handle rigidly mounted on the pivot rod, the user actuated lever handle being rotatable between a lock position and a release position; and
   a biasing spring that biases the user actuated lever handle to the lock position with a biasing force such that rotation of the user actuated lever handle from the lock position to the release position against the biasing force of the biasing spring causes rotation of the lever arm from a first position to a second position, wherein rotation from the first position to the second position actuates the backrest actuation cable, the modular backrest remote control being mountable in a vehicle wherein the biasing spring has a section attached to the pivot rod and a section attached to the mounting bracket assembly.

7. The modular backrest remote control of claim 6 wherein the pivot bracket is a U-shaped bracket having a first side wall opposing a second side wall, the first side wall and the second side wall connected by a third side wall.

8. The modular backrest remote control of claim 6 further comprising a cover attached to the mounting bracket assembly.

9. The modular backrest remote control of claim 6 wherein the backrest actuation cable includes an inner cable and an outer sheath such that mechanical force is transferred by movement of the inner cable relative to the outer sheath.

10. A method of assembling a vehicle rear seat, the method comprising:
    attaching a modular backrest remote control to a seat back;
    positioning the seat back with the modular backrest remote control in a vehicle at a vehicle's rear seat location; and
    attaching a seat bottom to the vehicle such that a seat bottom support frame is positioned adjacent the modular backrest remote control and below the seat back, wherein the modular backrest remote control includes:

a mounting bracket assembly;

a pivot bracket attached to the mounting bracket assembly;

a pivot rod rotatably mounted on the pivot bracket;

a lever arm mounted on the pivot rod, the lever arm rotatable from a first position to a second position, the lever arm having a connector for attachment to a backrest actuation cable;

a user actuated lever handle rigidly mounted on the pivot rod, the user actuated lever handle being rotatable between a lock position and a release position such that rotation of the user actuated lever handle from the lock position to the release position causes rotation of the lever arm from a first position to a second position, wherein rotation from the first position to the second position actuates the backrest actuation cable; and a biasing spring that biases the user actuated lever handle to the lock position, the biasing spring having a first section attached to the pivot rod and a second section attached to the mounting bracket assembly.

11. The method of claim 10 wherein the pivot bracket is a U-shaped bracket having a first side wall opposing a second side wall, the first side wall and the second side wall connected by a third side wall.

12. The method of claim 10 wherein the mounting bracket assembly includes a mounting bracket, the pivot bracket being positioned on the mounting bracket.

13. The method of claim 12 wherein the mounting bracket assembly further includes a first side bracket and a second side bracket attached to the mounting bracket wherein the pivot bracket is positioned between the first side bracket and the second side bracket, the first side bracket and the second side bracket each independently defining a first cutout region to allow positioning of the pivot rod.

14. The method of claim 10 wherein the modular backrest remote control further includes a cover attached to the mounting bracket assembly.

* * * * *